(12) United States Patent
Zangari et al.

(10) Patent No.: US 9,235,772 B2
(45) Date of Patent: Jan. 12, 2016

(54) NOTEBOOK AND METHOD FOR DIGITIZING NOTES

(71) Applicant: Moleskine S.p.A., Milan (IT)

(72) Inventors: Gabriel Zangari, Milan (IT); Luca De Battista, Milan (IT); Luca Mariani, Bereguardo PV (IT); Stefania Esposito, Milan (IT)

(73) Assignee: Moleskine S.p.A., Milan (IT)

( * ) Notice: Subject to any disclaimer, the term of this patent is extended or adjusted under 35 U.S.C. 154(b) by 0 days.

(21) Appl. No.: 14/423,278

(22) PCT Filed: Aug. 12, 2013

(86) PCT No.: PCT/IB2013/056573
§ 371 (c)(1),
(2) Date: Feb. 23, 2015

(87) PCT Pub. No.: WO2014/030093
PCT Pub. Date: Feb. 27, 2014

(65) Prior Publication Data
US 2015/0227803 A1 Aug. 13, 2015

(30) Foreign Application Priority Data

Aug. 24, 2012 (IT) .............................. MI2012A1441

(51) Int. Cl.
| | |
|---|---|
| H04N 1/04 | (2006.01) |
| H04N 1/40 | (2006.01) |
| G06K 9/22 | (2006.01) |
| G06K 9/20 | (2006.01) |
| B42D 1/00 | (2006.01) |
| H04N 1/387 | (2006.01) |

(52) U.S. Cl.
CPC .............. *G06K 9/2018* (2013.01); *B42D 1/003* (2013.01); *B42D 1/009* (2013.01); *H04N 1/3871* (2013.01)

(58) Field of Classification Search
None
See application file for complete search history.

(56) References Cited

U.S. PATENT DOCUMENTS

| | | | |
|---|---|---|---|
| 3,743,323 A | 7/1973 | Houss | |
| 5,014,328 A | 5/1991 | Rudak | |
| 5,465,213 A * | 11/1995 | Ross | ................. G06Q 20/204 270/52.02 |

(Continued)

FOREIGN PATENT DOCUMENTS

| | | |
|---|---|---|
| CA | 1148190 A1 | 6/1983 |
| JP | 2007-307714 A | 11/2007 |

*Primary Examiner* — Madelein Nguyen
(74) *Attorney, Agent, or Firm* — Novak Druce Connolly Bove + Quigg LLP

(57) ABSTRACT

Notebook comprising a plurality of pages (1) of paper bound together with a cover (2), in which a plurality of substantially vertical and/or substantially horizontal lines are printed on the pages (1) and are formed by a plurality of dots (5) aligned with each other, which have a maximum dimension, in particular diameter, comprised between 0.21 and 0.35 mm, the distance between two adjacent dots (5) of a same line being comprised between 0.43 and 0.7 mm and the color of the dots (5) being darker than the color of the page (1), in which the sum of the four quadrichrome CMYK values of the color of the page (1) is comprised between 0 and 20, in particular comprised between 10 and 20, with the K value less than 10, and the sum of the four CMYK values of the color of the dots (5) is comprised between 15 and 50, in particular between 25 and 40, with the value K less of 40. The present invention also relates to a method for digitizing notes by means of said notebook.

20 Claims, 1 Drawing Sheet

(56) References Cited

U.S. PATENT DOCUMENTS

Figure 1:
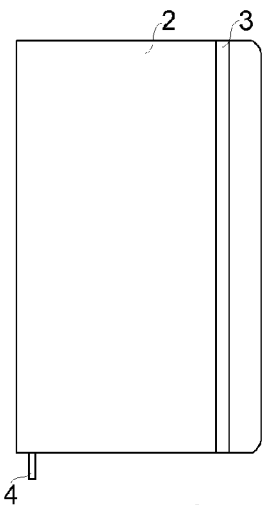

| | | | | |
|---|---|---|---|---|
| 5,484,292 A * | 1/1996 | McTaggart | B42C 9/00 345/901 |
| 5,761,485 A * | 6/1998 | Munyan | G06F 15/0283 326/8 |
| 5,810,604 A * | 9/1998 | Kopp, Jr. | G09B 5/062 200/5 A |
| 6,078,381 A * | 6/2000 | Suzuki | G03F 7/70066 355/53 |
| 6,406,787 B1 * | 6/2002 | Rajan | B41M 5/52 428/349 |
| 6,741,268 B1 * | 5/2004 | Hayakawa | G06F 3/0483 715/776 |
| 8,077,288 B2 * | 12/2011 | Kawashima | G03B 27/54 355/53 |
| 2002/0063694 A1 * | 5/2002 | Keely, Jr. | G06F 3/0412 345/173 |
| 2002/0152094 A1 * | 10/2002 | Fahraeus | G06F 3/0317 705/500 |
| 2003/0020801 A1 * | 1/2003 | Yamaguchi | G02B 26/125 347/259 |
| 2003/0075733 A1 * | 4/2003 | Yamazaki | H01L 21/2026 257/200 |
| 2003/0081191 A1 * | 5/2003 | Nishi | G03F 7/70058 355/69 |
| 2004/0080718 A1 * | 4/2004 | Kojima | G03B 21/14 353/55 |
| 2005/0120295 A1 * | 6/2005 | Sako | G06F 3/0317 715/224 |
| 2005/0123199 A1 * | 6/2005 | Mayzlin | G06K 9/342 382/181 |
| 2006/0190818 A1 * | 8/2006 | Wang | G06F 17/242 715/229 |
| 2007/0058868 A1 * | 3/2007 | Seino | G06F 3/0317 382/187 |
| 2007/0112841 A1 * | 5/2007 | Iwayama | G06F 3/03545 |
| 2008/0278734 A1 * | 11/2008 | Erikson | G06F 3/0317 358/1.1 |
| 2009/0096204 A1 | 4/2009 | Walker | |
| 2009/0154948 A1 * | 6/2009 | Cahill | G03G 15/2039 399/69 |
| 2009/0289927 A1 * | 11/2009 | Robin | G06F 17/24 345/204 |
| 2010/0044441 A1 * | 2/2010 | Cohen | G01N 21/251 235/469 |
| 2010/0182636 A1 * | 7/2010 | Wesson | H04N 1/46 358/1.15 |
| 2011/0211753 A1 * | 9/2011 | Lee | H04N 1/387 382/164 |
| 2012/0060000 A1 * | 3/2012 | Zhu | G06F 15/0291 711/154 |
| 2012/0066578 A1 * | 3/2012 | Robin | G06F 3/03545 715/212 |
| 2012/0206472 A1 * | 8/2012 | Kandekar | G06Q 30/0214 345/581 |
| 2013/0024544 A1 * | 1/2013 | Oshita | G06Q 30/00 709/217 |
| 2013/0073998 A1 * | 3/2013 | Migos | G06F 17/24 715/776 |
| 2013/0088511 A1 * | 4/2013 | Mitra | G06F 3/0483 345/629 |
| 2013/0107286 A1 * | 5/2013 | Shukuya | G03G 15/5058 358/1.5 |
| 2013/0148184 A1 * | 6/2013 | Azuma | G02B 21/08 359/223.1 |
| 2013/0170007 A1 * | 7/2013 | Kurashige | G02B 5/32 359/24 |
| 2013/0176374 A1 * | 7/2013 | Kurokawa | G02B 13/0005 347/224 |
| 2013/0267095 A1 * | 10/2013 | Heo | H01L 21/3086 438/703 |
| 2014/0118315 A1 * | 5/2014 | Black | G06F 3/03545 345/179 |
| 2014/0127667 A1 * | 5/2014 | Iannacone | G09B 5/02 434/379 |
| 2014/0229831 A1 * | 8/2014 | Chordia | G06F 3/0482 715/717 |
| 2014/0281900 A1 * | 9/2014 | Mesh-Iliescu | G06F 17/2205 715/234 |
| 2015/0121177 A1 * | 4/2015 | Iida | G06F 3/0483 715/201 |
| 2015/0135046 A1 * | 5/2015 | Moore | G06Q 10/06311 715/202 |
| 2015/0143209 A1 * | 5/2015 | Sudai | G06F 17/24 715/202 |
| 2015/0195421 A1 * | 7/2015 | Clisson | G06F 17/2217 382/100 |
| 2015/0241991 A1 * | 8/2015 | Shimizu | G06F 3/038 345/175 |

* cited by examiner

NOTEBOOK AND METHOD FOR DIGITIZING NOTES

CROSS REFERENCE TO RELATED APPLICATIONS

This application is a National Phase filing under 35 U.S.C. §371 of PCT/IB2013/056573 filed on Aug. 12, 2013; and this application claims priority to Application No. MI2012A001441 filed in Italy on Aug. 24, 2012 under 35 U.S.C. §119. The entire contents of each application are hereby incorporated by reference.

The present invention relates to a notebook particularly suitable for the digitization of the notes taken on its pages. The present invention also relates to a method for digitizing notes by means of said notebook.

In known methods for digitizing notes a user photographs with a digital camera notes on a page of a notebook, after which the digital image of this page is processed by a local or remote computer to convert the notes into digital data. These known methods suffer from conversion errors of the notes due not only to the inevitable low graphic quality of the notes, which are written by hand, but also to chromatic aberrations, distortions, misalignments, light variations and/or other errors induced in the image of the notebook page photographed by the digital camera.

As a matter of fact, the conversion of the pages of a notebook using a digital camera requires algorithms for the conversion of the notes which are substantially different from those used for the conversion of notes written on single pages, namely unbound, acquired by a scanner, wherein said conversion errors not are present since the single pages remain still, flat and in close contact with a scanner during their conversion, which however is not possibile by photographing pages of a notebook, which tend to bend due to the binding and always have light, distance and angle variations with respect to the digital camera. To overcome these drawbacks conversion algorithms could exploit the horizontal and/or vertical present in the known striped or checked notebooks, however in this case the lines would be confused with the notes, or vice versa, creating further conversion errors.

Object of the present invention is therefore to provide a method for digitizing notes that is free from such drawbacks. Said object is achieved with a notebook and a method whose main features are specified respectively in claims 1 and 8, while other features are specified in the remaining claims.

Thanks to the particular lines formed by dots which in turn have particular colors, sizes and distances, the notebook according to the present invention can be advantageously used to take notes that can be converted into data in a much more precise way compared to known notebooks and methods. In fact, these particular lines are not confused with the notes, even in difficult lighting and orientation conditions, so that they can serve as a guiding grid both to write the notes in an neat manner and to correct any conversion errors due to the binding or to the inclination of the notebook pages.

According to a particular aspect of the invention, the notebook is provided with sheets of special adhesive labels that can be converted into digital commands together with the notes. With this arrangement the notebook, while being free of electrical or electronic elements, is transformed into a complete input device not only of data but also of commands, which also allows inexperienced users to interact in an advanced manner with electronic devices and systems (smartphones, tablet PCs, data servers, cloud and web applications, etc.), in particular to log in or activate these systems, or to catalog and/or format the acquired data, which can then be easily stored in local and/or remote databases.

The present invention also relates to particular ranges of values of the colors of the pages, lines and labels, which have provided unexpected and surprising results in terms of conversion precision of the photographed images, namely of reduction of the errors due to possible mutual confusions between notes, lines, adhesive labels and light reflections on the pages of the notebook.

Figure 2:
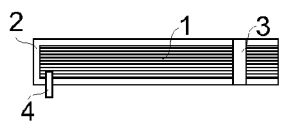
Figure 3:
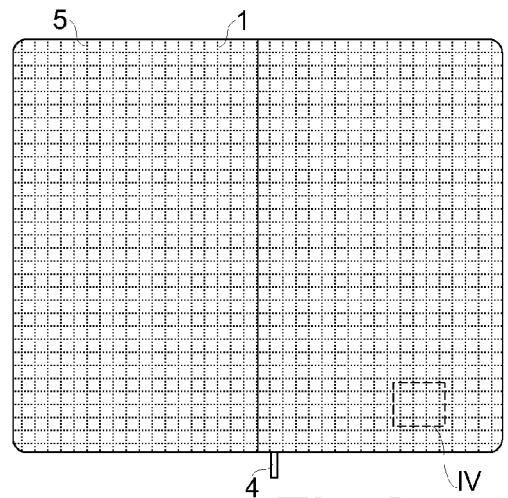
Figure 4:
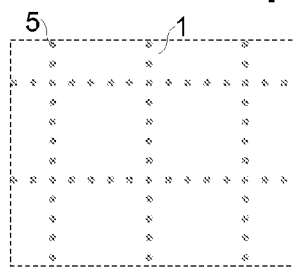
Figure 5:
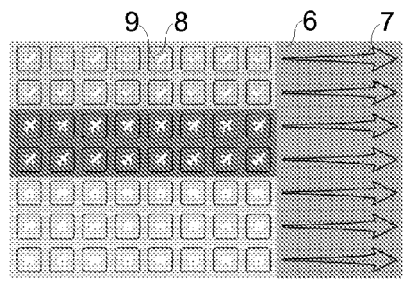
Figure 6:
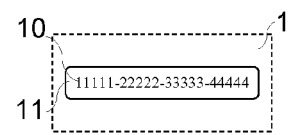
Figure 7:
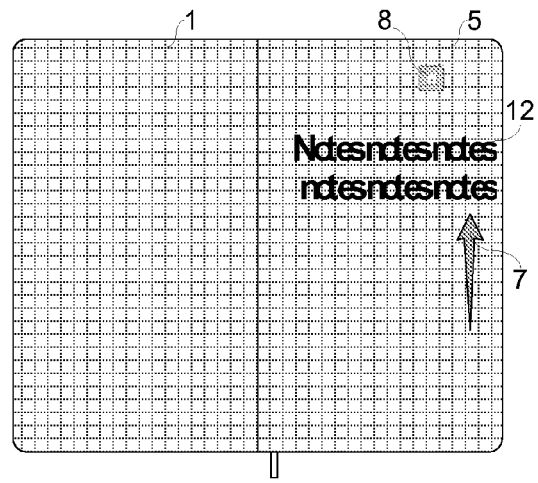

Further advantages and features of the notebook and the method according to the present invention will become apparent to those skilled in the art from the following detailed and non-limiting description of an embodiment thereof with reference to the attached drawings in which:

FIG. 1 shows a top view of the closed notebook;
FIG. 2 shows a side view of the notebook of FIG. 1;
FIG. 3 shows a top view of the notebook of FIG. 1, when opened;
FIG. 4 shows the enlarged detail IV of FIG. 3;
FIG. 5 shows a sheet of adhesive labels;
FIG. 6 shows a detail of a page of the notebook of FIG. 1; and
FIG. 7 shows the notebook of FIG. 3 with some notes and labels.

Referring to FIGS. 1 to 3, it is seen that the notebook comprises a plurality of pages 1 of paper, bound together with a cover 2 which can be provided with an elastic tape 3 to keep the notebook closed. The notebook may also include a bookmark 4. A plurality of substantially vertical and/or substantially horizontal lines are printed on pages 1.

Referring also to FIG. 4, it is seen that said substantially vertical and/or substantially horizontal lines are formed by a plurality of dots 5 aligned with each other, which have a maximum size, in particular a diameter, comprised between 0.21 and 0.35 mm. The distance between two adjacent dots 5 of a same line is comprised between 0.43 and 0.7 mm. The color of dots 5 is darker than the color of the page 1. The color of page 1 is white or a color tending to white, particularly ivory, light beige or vanilla, preferably the color PANTONE 11-0104 TPX. The sum of the four quadrichrome CMYK values (percentages of cyan, magenta, yellow and black) of the color of page 1 is comprised between 0 and 20, in particular between 10 and 20, with the fourth value K (black) less than 10. The sum of the four CMYK values of the color of dots 5 is instead comprised between 15 and 50, in particular between 25 and 40, with the fourth value K (black) less than 40. The difference between the sums of the CMYK color values of dots 5 and of page 1 is greater than 10. The four CMYK values of the color of dots 5 are preferably comprised between 0/3/6/16 and 0/5/11/23, namely between the colors PANTONE 400 U and 401 U.

Referring to FIG. 5, it is seen that the notebook is also provided with one or more sheets 6 comprising one or more adhesive labels 7, 8 which can be detached from a sheet 6 and applied on a page 1 of the notebook. The adhesive labels 7, 8 have a shaped profile and/or include a graphic symbol 9 (one or more figures and/or alphanumeric characters) printed on them. In particular, one or more adhesive labels 7 have a profile and/or a graphical symbol in the form of an arrow. The sum of the four CMYK values of the color of the adhesive labels 7, 8 and/or of their graphic symbol 9 is comprised between 50 and 150, in particular between 70 and 150, with the fourth value K (black) less than 50, as preferably the colors Pantone 109, 1495, 232, 2665, 319, 376 and Process Blue.

Referring to FIG. 6, it is seen that the notebook is preferably also provided with a code 10, in particular a sequence of alphanumeric characters, that is printed on a page 1 (which can also be devoid of dots 5) and/or on cover 2. In particular, code 10 is printed on an adhesive label 11 which is in turn applied on a page 1 and/or on cover 2 of the notebook.

The method of digitizing notes comprises the following steps:
- writing one or more notes 12 on at least one page 1 of the notebook;
- apply at least one adhesive label 7, 8 on page 1;
- photographing page 1 with a digital camera (not shown in the figures), which can be incorporated in another digital device, such as a smartphone or a tablet PC.

The digital image of page 1 photographed by said digital camera is then digitally processed by a computer (smartphone, tablet, notebook, PC, web server, etc.) so as to convert notes 12 into digital data and the adhesive label 7, 8 into one or more digital commands associated with notes 12, such as a classification command (work, travel, home, etc.) of the contents of notes 12.

If the adhesive label 7 is and/or includes an arrow, the data corresponding to the notes indicated by the arrow 12 are extracted by the computer from the rest of the data corresponding the notes 12, for example a storage in a separate field (title, subject, address, etc.) of a data base.

In a preliminary step of said method, the user photographs code 10, which code is then scanned to provide a unique digital command to a computer, in particular a unique command of activation and/or registration of a web service suitable to provide the above digital processing of notes 12 and labels 7, 8.

Possible variations and/or additions may be made by those skilled in the art to the embodiment of the invention herein described and illustrated remaining within the scope of the following claims. In particular, further embodiments of the invention may comprise the technical features of one of the following claims with the addition of one or more technical features, taken singularly or in any mutual combination, described in the text and/or illustrated in the drawings.

The invention claimed is:

1. Notebook comprising a plurality of pages of paper bound together with a cover, in which a plurality of substantially vertical and/or substantially horizontal lines are printed on the pages, wherein said substantially vertical and/or substantially horizontal lines are formed by a plurality of dots aligned with each other, which have a maximum dimension, in particular diameter, comprised between 0.21 and 0.35 mm, the distance between two adjacent dots of a same line being comprised between 0.43 and 0.7 mm and the color of the dots being darker than the color of the page, in which the sum of the four quadrichrome CMYK values of the color of the page is comprised between 0 and 20 with the K value less than 10, and the sum of the four CMYK values of the color of the dots is comprised between 15 and 50 with the value K less of 40.

2. Notebook according to claim 1, wherein the difference between the sums of the CMYK values of the colors of the dots and of the page is greater than 10.

3. Notebook according to claim 2, wherein the four CMYK values of the color of the dots are comprised between 0/3/6/16 and 0/5/11/23.

4. Notebook according to claim 2, wherein it is also provided with one or more sheets comprising one or more adhesive labels having a shaped profile and/or comprising a graphic symbol printed on them.

5. Notebook according to claim 2, wherein it is also provided with a code printed or applied on a page and/or on the cover.

6. Notebook according to claim 1, wherein the four CMYK values of the color of the dots are comprised between 0/3/6/16 and 0/5/11/23.

7. Notebook according to claim 6, wherein it is also provided with one or more sheets comprising one or more adhesive labels having a shaped profile and/or comprising a graphic symbol printed on them.

8. Notebook according to claim 6, wherein it is also provided with a code printed or applied on a page and/or on the cover.

9. Notebook according to claim 1, wherein it is also provided with one or more sheets comprising one or more adhesive labels having a shaped profile and/or comprising a graphic symbol printed on them.

10. Notebook according to claim 9, wherein one or more adhesive labels have an arrow-shaped profile and/or graphical symbol.

11. Notebook according to claim 10 wherein the sum of the four CMYK values of the color of the adhesive labels and/or of their graphic symbol is comprised between 50 and 150 with the K value less than 50.

12. Notebook according to claim 10 wherein the sum of the four CMYK values of the color of the adhesive labels and/or of their graphic symbol is comprised between 70 and 150 with the K value less than 50.

13. Notebook according to claim 9, wherein the sum of the four CMYK values of the color of the adhesive labels and/or of their graphic symbol is comprised between 50 and 150 with the K value less than 50.

14. Notebook according to claim 9 wherein the sum of the four CMYK values of the color of the adhesive labels and/or of their graphic symbol is comprised between 70 and 150 with the K value less than 50.

15. Notebook according to claim 9, wherein it is also provided with a code printed or applied on a page and/or on the cover.

16. Notebook according to claim 1, wherein it is also provided with a code printed or applied on a page and/or on the cover.

17. Notebook according to claim 1, wherein the sum of the four quadrichrome CMYK values of the color of the page is comprised between 10 and 20, and the sum of the four CMYK values of the color of the dots is comprised between 25 and 40.

18. Method for digitizing notes, wherein it comprises the following steps:
- writing one or more notes on at least one page of a notebook according to claim 1;
- photographing this page with a digital camera;
- processing the digital image of the page photographed by said digital camera so as to convert said notes into digital data.

19. Method according to claim 18, wherein at least on adhesive label is applied on the page before photographing it, so that the adhesive label is converted into one or more digital commands when processing the digital image of the page.

20. Method according to claim 19, wherein if the adhesive label is and/or comprises an arrow, the data of the notes indicated by the arrow are extracted from the rest of the data corresponding to the notes when processing the digital image of the page.

* * * * *